US011109587B2

(12) United States Patent
Pirotte

(10) Patent No.: US 11,109,587 B2
(45) Date of Patent: Sep. 7, 2021

(54) LIMONENE: FORMULATION AND INSECTICIDE USE

(71) Applicant: AGRYPHAR SPRL, Seraing (BE)

(72) Inventor: Alan Pirotte, Houffalize (BE)

(73) Assignee: ARYSTA LIFESCIENCE BENELUX SPRL, Seraing (BE)

( * ) Notice: Subject to any disclaimer, the term of this patent is extended or adjusted under 35 U.S.C. 154(b) by 0 days.

(21) Appl. No.: 15/520,272

(22) PCT Filed: Oct. 20, 2015

(86) PCT No.: PCT/EP2015/074267
§ 371 (c)(1),
(2) Date: Apr. 19, 2017

(87) PCT Pub. No.: WO2016/062718
PCT Pub. Date: Apr. 28, 2016

(65) Prior Publication Data
US 2017/0311588 A1    Nov. 2, 2017

(30) Foreign Application Priority Data
Oct. 20, 2014    (EP) .................................... 14189557

(51) Int. Cl.
*A01N 25/02* (2006.01)
*A01N 27/00* (2006.01)
*A01N 25/00* (2006.01)

(52) U.S. Cl.
CPC .............. *A01N 25/02* (2013.01); *A01N 27/00* (2013.01); *A01N 25/00* (2013.01)

(58) Field of Classification Search
CPC ......... A01N 25/02; A01N 25/00; A01N 27/00
See application file for complete search history.

(56) References Cited

U.S. PATENT DOCUMENTS

| 4,379,168 A | 4/1983 | Dotolo |
| 8,507,234 B2 | 8/2013 | Holt et al. |
| 2005/0169953 A1 | 8/2005 | Flashinski |
| 2006/0199739 A1* | 9/2006 | Messerschmidt ...... A01N 27/00 504/357 |
| 2008/0146444 A1 | 6/2008 | Fabri et al. |
| 2009/0099135 A1 | 4/2009 | Enan |
| 2011/0195839 A1* | 8/2011 | Schlotterbeck ........ A01N 25/00 504/100 |

FOREIGN PATENT DOCUMENTS

| CA | 2187552 | 4/1998 |
| CA | 2198327 | 8/1998 |
| CN | 104872150 A | 9/2015 |
| CN | 108244147 A | 7/2018 |
| CN | 109221140 A | 1/2019 |
| CN | 109645002 A | 4/2019 |
| DE | 19720604 | 11/1998 |
| EP | 0735919 B1 | 1/1998 |
| GR | 1008212 | 6/2014 |
| JP | 2005514407 A | 5/2005 |
| WO | 9848625 A1 | 11/1998 |
| WO | 0049865 A2 | 8/2000 |
| WO | 03105265 A1 | 12/2003 |
| WO | 2008097553 A2 | 8/2008 |
| WO | 2010144919 A1 | 12/2010 |
| WO | 2011024135 | 3/2011 |
| WO | 2016062718 A1 | 4/2016 |

OTHER PUBLICATIONS

Kourniatis et al. "Formation of Orange Oil-in-Water nanoemullsions using Nonionic Surfactant Mixtures by High Pressure Homogenizer" Colloid Journal, 2010, vol. 72, No. 3, pp. 396-402. (Year: 2010).*
Turek et al., "Stability of Essential Oils: A Review", Comprehensive Reviews in Food Science and Food Safety, 2013, vol. 12, pp. 40-53. (Year: 2013).*
Edler, J., "Relative solubility number RSN—an alternative measurement to logPow for determining the bioaccumulation potential," Master of Science Thesis in the Master Degree Programme, Materials and Nanotechnology, Department of Chemical and Biological Engineering, Applied Surface Chemistry, Chalmers University of Technology, Göteborg Sverige 2011.
Pasquali, R.C. et al., "Some considerations about the hydrophiliclipophilic balance system," International Journal of Pharmaceutics, 356, 2008, pp. 44-51, Available online Jan. 3, 2008.
Yang, J. et al., "Preparation of D-limonene Oil-in-Water nanoemulsion from an Optimum Formulation," Journal of Oleo Science, 2014. vol. 63, Issue 11, pp. 1133-1140, Oct. 7, 2014.
Experimental Report including declaration of Dr. Cornelius Uys providing experimental data as to sufficiency of disclosure, Nov. 15, 2018.
"HLB Numbers, Solvent Miscibility and Emulsification Characteristics of NEODOL Ethoxylates"; Shell Chemicals Data Sheet; http://www.shell.com>textimage.stream>hlb-numbers-neodolethoxylates; 3 pages; printed Jan. 24, 2019.
Dow Technical Data Sheet: "TERGITOL 15-2-7 Surfactant"; D10b; The Dow Chemical Company; Form 119-01949-1107; www.dow.com>scripts>litorder>lifepath=surfactants>pdfs>noreg; 2 pages; printed Jan. 24, 2019.
Technical Data Sheet; "TERGITOL 15-S-9 Surfactant"; D10a; The Dow Chemical Company; Form No. 119-01950-1107; msdssearch.dow.com>PublishedLiteratureDOW.COM>119-01950.pdf; Form No. 11901950-1107; Printed Jan. 24, 2019.
(Continued)

*Primary Examiner* — Samira J Jean-Louis
(74) *Attorney, Agent, or Firm* — Cantor Colburn LLP

(57) ABSTRACT

The current invention concerns a composition, in the form of an emulsifiable concentrate, comprising more than 50% limonene as active ingredient and a surfactant system with an anionic wetting agent and a non-ionic polymeric surfactant and with less than 10 wt % solvent. The composition with high load of nature derived active ingredient remains stable, preferably even when subjected to cold storage. The invention also provides in the use of a limonene comprising composition as acaricide or insecticide, and in a method of treating plants and crops with a limonene comprising composition.

9 Claims, No Drawings

(56) References Cited

OTHER PUBLICATIONS

Cush; "Back to basics: A review of pesticide formulation types"; Golf Course Management, vol. 74, Issue No. 1; 2006; pp. 143-145.
Gupta et al.; "Nanoemulsions: Formation, Properties and Applications"; Soft Matter, vol. 12, Issue 11; 2016; DOI: 10.1039/C5SM02958A; pp. 2826-2841.
European Search Report for Application No. 14189557.3; Date of Report: Feb. 9, 2015; 10 pages.
Great Britain Search Report for Application GB1919179.0; Date of Search: Jun. 19, 2020; 7 pages.
International Search Report and Written Opinion for International Application No. PCT/EP2015/074267 International Filing Date: Oct. 20, 2015; dated Nov. 16, 2015; 12 pages.
Oya, M.; "What is a surfactant [7]: AE (Alcohol Ethoxylates)"; Available Online at www.detergent.jp/kaisetsu/surf07.pdf; Retrieved on Jul. 16, 2020; 4 pages.

* cited by examiner

LIMONENE: FORMULATION AND INSECTICIDE USE

TECHNICAL FIELD

The invention pertains to the technical field of agrochemicals derived from a natural source. More in particular it pertains to the use of limonene. A way of formulating highly concentrated limonene is provided which is storage stable, even in the cold. It can be used as an insecticide or acaricide, particularly against mites or scales.

BACKGROUND

To be economically viable it is of interest to have concentrated emulsifiable compositions, with a high load of pesticidal active ingredient. EC formulations typically comprise a pesticidal active ingredient, emulsifying surfactant and solvent.

The problem associated with high amounts of active ingredient is that these compositions are sensitive to form deposits of active ingredient when stored cold.

Polymeric surfactants have become popular for the formulation of emulsifiable concentrates. Their use in highly loaded EC formulations is limited as they are particularly sensitive to cold and form deposits.

Formation of deposits can lead to loss of active ingredient in a spray tank and blockage of spray equipment, e.g. spray nozzles.

Consequently, there is a demand for improved emulsifiable formulations.

In addition, there is much interest in the replacement of synthetic pesticidal active ingredients by ingredients sourced from nature.

Consequently, there is a demand for emulsifiable formulations containing nature derived active ingredients as active substances; preferably as the only active ingredient present in a formulation.

A candidate active ingredient for use in emulsifiable compositions for use as pesticide is limonene. Limonene is obtainable out of an extract of citrus fruit peels. It is present in high concentrations in citrus oil, lemon oil, orange oil, lime oil, grapefruit oil and tangerine oil. Especially orange oil has a high content of limonene, typically at least 90%.

Limonene however is prone to oxidation when exposed to air or to oxygen. Oxidation of limonene lowers its effectiveness as pesticide, shortens the shelf life and creates undesired side products.

EP 1 657 979 describes a ready to use insecticide comprising as active ingredients at least 0.01% insecticide, at least 0.1% limonene, a surfactant, at least 20% water and a hydrocarbon solvent. The insecticide is a synthetic pyrethroid, natural pyrethrum, or organophosphate. The potential of using limonene as single active ingredient has not been realised. In addition it is desired to replace hydrocarbon solvents in agrochemical formulations, as their presence leads to an undesired product classification. For instance, the aromatic hydrocarbon solvent, known as Solvesso 200, is a suspected carcinogen as indicated by a H351 hazard statement. Other grades of this important family of solvent are classified as aspiration hazard, Category 1 (may be fatal if swallowed and enters airways).

EP 2 200 429 describes a composition comprising a high terpene based oil, a stabiliser, a chelating agent, a preservative and one or more organic solvents in addition to the active ingredient. The presence of a stabiliser points to stability issues. Again, use of organic solvents in agrochemical formulations, especially those that are going to be positioned as environmentally unfriendly, is undesired.

The invention thereto aims to provide a composition comprising limonene suitable to be used as an insecticide, which overcomes at least one of the problems mentioned above.

SUMMARY OF THE INVENTION

The invention provides a water emulsifiable composition, comprising more than 50 wt % limonene and an emulsifying surfactant, characterised in that the composition is essentially free of solvents.

In particular the invention provides a composition, comprising
more than 50 wt % limonene,
an emulsifying non-ionic polymeric surfactant,
to less than 10 wt % solvent based on the total weight of the composition, characterised in that.
the composition further comprises an anionic wetting agent and
the composition is in the form of an emulsion concentrate.

This highly concentrated composition has the advantage that the use of oxygen-comprising water can be reduced and preferably even avoided. As the exposure of limonene to water is reduced until the composition is diluted with water, oxidation of limonene prior to its use is reduced. As the composition is also essentially free of an organic solvent, the composition may not attract negative labelling requirements (H351, H304) associated with the use of organic solvents, in particular aromatic solvents.

In a second aspect, the invention provides in a use of a composition according to an embodiment of the invention as an acaricide or insecticide, particularly against Acari (mites), Coccoide (scales) or Aleyrodidae (white flies).

In the past treatment of these pests was not effective with the available products. With the availability of highly formulated and storage stable products, higher amounts of limone can be dosed and have effect.

In a third aspect, the invention provides in a method for curative treatment of insects, preferably insects belonging to the group of Acari or mites, Coccoidea or scales and Aleyrodidae or white flies, comprising the following steps:
emulsifying a limonene comprising composition according to an embodiment of the invention in water to obtain an emulsion;
applying said emulsion to said insects at an effective dose.

The availability of a highly concentrated, emulsifiable and storage stable formulation allows the preparation of a broad range of application liquids, such as spray liquids. The concentration of limonene in a spray liquid can easily be modified according to the insect pest to be treated.

In a preferred embodiment the effective dose at which the emulsion is applied to insects is between 60 g limonene per hectare and 2500 g limonene per hectare, preferably between 120 g limonene per hectare and 2000 g limonene per hectare, more preferably between 150 g limonene per hectare and 1800 g limonene per hectare, even more preferably between 250 g limonene per hectare and 1200 g limonene per hectare and most preferably between 500 g limonene per hectare and 1000 g limonene per hectare, for example 750 g limonene per hectare. In a further preferred embodiment the insects to be treated are preferably mite, whitefly, aphid, leaf hopper, *lygus* bug, mealy bug, beet armyworm, *thrips*, cabbage looper, diamondback moth, cabbageworm or armyworm.

In a preferred embodiment the effective dose at which the emulsion is applied to insects belonging to the group of Acari or mites, Coccoidea or scales and Aleyrodidae or white flies is between 750 g limonene per hectare and 2500 g limonene per hectare, preferably between 900 g limonene per hectare and 2000 g limonene per hectare, more preferably between 1000 g limonene per hectare and 1800 g limonene per hectare, even more preferably between 1100 g limonene per hectare and 1500 g limonene per hectare and most preferably between 1200 g limonene per hectare and 1400 g limonene per hectare, for example 1300 g limonene per hectare.

DETAILED DESCRIPTION OF THE INVENTION

The expression "% by weight" or "wt %" (weight percent), here and throughout the description unless otherwise defined, refers to the relative weight of the respective component based on the overall weight of the formulation.

As used herein, the terms "pesticidal effect" and "pesticidal activity" mean any direct or indirect action on the target pest that results in reduced feeding damage on any part of the plant, including but not limited to the seeds, roots, shoots and foliage of plants as compared to untreated plants.

The terms "active against a (first or second) pest", also have the same meaning. Such direct or indirect effects include inducing death of the pest, repelling the pest from any part of the plant, including but not limited to seeds, roots, shoots and/or foliage, inhibiting feeding of the pest on, or the laying of its eggs on, the plant seeds, roots, shoots and/or foliage, and inhibiting or preventing reproduction of the pest.

"Plant pest" means any organism known to associate with plants and which, as a result of that association, causes a detrimental effect on the plant's health and vigor. Plant pests include but are not limited to fungi, bacteria, viruses, molds, insects, mites and nematodes or any other organism that causes a detrimental effect on the plant's health or vigor, excluding mammals, fish and birds.

The term "plant" as used herein encompasses whole plants and parts of plants such as roots, shoots, stems, leaves, seedlings, germinated seeds and seed, as well as cells and tissues within the plants or plant parts. The term plant includes transgenic and non-transgenic plants.

The term "insecticidal activity" has the same meaning as pesticidal activity, except it is limited to those instances where the pest is an insect.

As used herein, the "shoots and foliage" of a plant are to be understood to be the shoots, stems, branches, leaves and other appendages of the stems and branches of the plant after the seed has sprouted, including the roots of the plant. It is preferable that the shoots and foliage of a plant be understood to be those parts of the plant that have grown from the seed and/or shoots of a "mother" plant.

In a first aspect, the invention provides emulsifiable compositions comprising 1-methyl-4-(1-methylethenyl)-cyclohexene as active ingredient, commonly known as limonene, in accordance with claim 1.

In particular, the invention provides a water emulsifiable composition, comprising more than 50 wt %, 55 wt %, 56 wt %, 57, wt %, 58 wt %, 59 wt % or more than 60 wt % limonene and an emulsifying surfactant or surfactant system, comprising one or more surfactants, characterised in that the composition is essentially free of solvents. In a preferred embodiment, the composition comprises more than 65%, preferably more than 70%, and most preferably more than 71 wt % of limonene relative to the total weight of the composition. A most preferred composition typically has a limonene content of 71-72 wt % relative to the total weight of the composition.

In a preferred embodiment, limonene is present in the composition as the enantiomeric pure form of D-limonene, CAS: 5989-27-5. In another embodiment, limonene is present in the composition as the enantiomeric pure form of L-limonene, CAS: 5989-54-8. In yet another embodiment limonene is present as a racemic mixture, also known as dipentene, CAS: 138-86-3. Most preferably, a composition according to the invention comprises more than 60 wt % D-limonene, preferably at least 65 wt % D-limonene, most preferably at least 70 wt % D-limonene.

Limonene can be obtained via a synthetic route, or limonene can be extracted from a natural source. As the synthetic route is too costly in view of the material available from natural sources, most commercially available limonene is from a natural source. D-Limonene can be obtained commercially from citrus fruits through two primary methods: centrifugal separation or steam distillation.

With the word "citrus fruit" is meant a fruit of the genus Citrus, preferably selected from the list of citrus, mandarine, orange, kumquat, lemon, lime, grapefruit, pomelo, citrange, citron.

In a preferred embodiment, limonene is obtained out of an extract of citrus fruit peels. In further embodiments said citrus fruit oil is selected from the group consisting of orange oil, lemon oil, lime oil, grapefruit oil and tangerine oil. In a preferred embodiment, said citrus fruit oil is orange oil. In a more preferred embodiment said orange oil is selected from the list of technical grade orange oil, CAS 94266-47-4; food grade orange oil, CAS 8028-48-6 or cold pressed orange oil. The person skilled in the art is familiar with orange oil and its characteristics from its listing as active substance (SANCO/12083/2013 rev 3, 2013) and the standard references ISO 3140:211 and the European Pharmacopoeia 5.0, 2005.

In a preferred embodiment, the citrus fruit oil, preferably orange oil is directly used in the composition without the need to purify the limonene out of the oil. In a preferred embodiment, orange oil is the only active ingredient present in the composition.

In an alternative embodiment, other terpenes or terpenoids are present in the composition, preferably carvone, carveol, limonene oxide, p-cymene, α-pinene, β-pinene, myrcene, β-ionone, linalool, geraniol or eugenol. In another alternative embodiment, oils extracted from plants, preferably mint, peppermint, spearmint, clove or rosemary are used in the composition.

A composition according to the invention is essentially free of solvent; in particular free of water and organic solvent, in particular aromatic solvent. By the term "substantially solvent free" as used in the present invention, is meant a composition with less than 10 wt % solvent based on the total weight of the composition.

The composition of the invention comprises less 10 wt % solvent, preferably less than 5 wt % solvent, and most preferably solvent-free, although traces, less than 0.1%, of solvent can't be excluded, all percentages are weight by weight. In a preferred embodiment the composition comprises less than 10 wt % water, preferably less than 8 wt % water, most preferably less than 5 wt % water and most preferably water-free, although traces, less than 0.1 wt %, of water can't be excluded, all percentages are weight by weight.

Large amounts of oxygen can be solubilized in water. For instance, water at a temperature of around 20° C. contains about 9 mg/l oxygen. When water is part of the composition, oxygen can oxidize the limonene to other compounds, which can be less active or even inactive or harmful. Terpene oxides are known to cause skin sensitization. The low water content and consequently the small amount of oxygen dissolved in water can reduce this oxidation process. It can prevent the formation of other compounds. It can prolong the shelve life of the composition. An additional benefit of having a composition with little or no water-content is that for the shipment and storage less weight and volume need to be taken into account, which reduces the cost associated with logistics.

Orange oil is poorly soluble in water. For orange oil or limonene to be able to form a stable emulsion when added to water a surfactant is needed. The surfactant forms micelles, with a hydrophobic core and a hydrophilic outer shell. The limonene will occupy the space in the hydrophobic cores of these micelles. The substantial absence of water and organic solvent such as naphtha solvent, i.e. less than 10 wt %, in a composition of the present invention excludes a whole range of surfactants commonly used in the prior art for solvent based systems as these surfactants will not be soluble in limonene. In a preferred embodiment, the surfactant is soluble in the composition with less than 10 wt % water, even at temperatures from −5° C. to 54° C. for a minimum period of 14 days. Solubility can be measured by mixing the limonene, possibly as orange oil, and the surfactant. If upon standing for 14 days, phase separation follows, it can be concluded that the surfactant is not soluble in the limonene or orange oil.

In a preferred embodiment, the surfactant has a hydrophilic-lipophilic balance (HLB) value between 7 and 12, preferably 10.5. A HLB in this region is a compromise between the solubility of the surfactant in limonene and the ability to stabilize an emulsion of limonene when added to water, which can be considered as an oil in water-type system. A person skilled in the art would pick a surfactant with a HLB-value between 12 and 16 to obtain an emulsion.

The non-ionic surfactant present in a composition according to the invention is a non-ionic polymeric surfactant. More preferable the polymeric surfactant is an alkoxylated alcohol, even more preferably a fatty alcohol alkoxylate, most preferably an ethoxylate and/or a propoxylate, preferably of a fatty alcohol, and most preferable an iso-tridecanol alkoxylate, even most preferably an iso-tridecanol pentaethoxylate. The surfactant is preferably present in an amount of 5 to 40%, more preferably in 10 to 20%, most preferably 12-13%, all weight by weight.

By the term "fatty alcohol" as used herein, is meant a linear or branched alcohol with a carbon chain length of at least 4 carbon atoms, preferably at least 6, more preferably at least 8, even more preferably at least 10, most preferably at least 12.

In a preferred embodiment, an emulsifiable concentrate according to the invention comprising limonene, with the ability to form a stable emulsion when added to water, is used as an insecticide or acaricide. The composition is added to water and the limonene in combination with the surfactant form an emulsion, which can be applied to plants, crops or directly on the pest. The dilution with water is modified to provide a desired dose rate of active ingredient. The dose rate is selected according to the pest.

A composition according to the invention comprises a wetting agent, which helps to lower the surface tension of the emulsion formed after adding the composition to water. This lowered surface tension helps to coat a larger surface of the leaves of the crop with the composition and this results in that more insects get in touch with the insecticide. The need for a wetting agent is even bigger when the leaves of the crop are having a wax-like surface, for example leaves of citrus, or when the leaves are having hydrophobic glandular hairs on their surface to repel water droplets, for example tomato leaves.

Here again, the low water content composition does not allow wetting agents that are commonly used in the prior art. The wetting agent is commonly a water soluble anionic surfactant. These surfactants require water to form a stable solution, as their counter ion is commonly a calcium ion, an ammonium ion, a sodium ion or a potassium ion.

Anionic surfactants include agents such as sodium stearate, potassium palmitate, sodium cetyl sulfate, sodium lauryl phosphate, sodium polyoxyethylene lauryl sulfate, triethanolamine palmitate, polyoxyethylene sodium lauryl phosphate, and sodium N-acyl glutamate.

The wetting agent in a composition according to the invention, is preferably an anionic surfactant with the anionic part preferably being an alkylbenzene sulfonate, more preferably a dodecylbenzene sulfonate. The cationic counter ion is preferably chosen out of the list of triethylammonium ion, triethanolammonium ion, tetrabutylammonium ion, or other tetra-alkylammonium ions, tetraphenylphosphonium ion or other tetraalkylphosphonium ions or a combination of a metal-ion and a crown ether.

In a preferred embodiment, the wetting agent preferably is an ethanolamine alkylbenzenesulfonate. In a preferred embodiment the wetting agent is triethanolammonium dodecylbenzene sulfonate, CAS: 27323-41-7. A combination of this anion and counter ion allows the wetting agent to be soluble in the composition without solvent other than the limonene. An emulsifiable composition of limonene and this type of surfactant in the absence of solvent other than the active ingredient was found to have good cold storage stability. Preferably the cold storage stability is provided in a temperature range between −20° C. and 5° C., preferably between −10° C. and 4° C., more preferably between −5° C. and 3° C., most preferably between −4° C. and 0° C. Cold storage stability was measured for compositions stored for a period of 1 day, 7 days or 14 days. The test was performed according to CIPAC method MT 39.1. Measurement methods are known to a person skilled in the art. Compositions according to the invention have improved cold storage stability.

The wetting agent is preferably present in the emulsifiable composition in an amount of 5 to 25%, more preferably in 10 to 20%, most preferably 15-16%, expressed in weight percent by total weight of the composition.

In a preferred embodiment, the composition comprises an antioxidant. Preferably the antioxidant is chosen from the list diphenylamine, ethoxyquin, BHA which is a mixture of 3-t-butyl-4-hydroxyanisole and 2-t-butyl-4-hydroxyanisole, BHT corresponding to 2,6-di-tert-butyl-p-cresol, ascorbic acid, the tocopherols and the polyphenols. The presence of an antioxidant may protect the limonene from oxidising. For instance, traces of oxygen can get into the composition or the headspace of the bottle after the bottle has been opened. This is advantageous as limonene oxides are suspected sensitizers.

The antioxidant is preferably present in less than 1%, more preferable less than 0.5%, most preferably less than 0.1%, all weight by weight of the total composition.

In a preferred embodiment the antioxidant is BHT or BHA. The composition preferably comprises less than 1% BHT or BHA %, more preferable less than 0.5% BHT or BHA %, most preferably less than 0.1% BHT or BHA %, all weight by weight of the total composition.

Other conventional inactive or inert ingredients can be incorporated into the limonene formulations. Such inert ingredients include but are not limited to: conventional sticking agents, dispersing agents such as methylcellulose, polyvinyl alcohol, lecithin, polymeric dispersants such as polyvinylpyrrolidone/vinyl acetate, emulsion stabilizers, surfactants, antifreeze compounds such as urea, dyes, colorants. By including suitable additives, for example additives for improving the distribution, adhesive power and resistance to rain on treated surfaces, the limonene compositions can be better adapted for various utilities.

Further inert ingredients useful in the present invention can be found in McCutcheon's, vol. 1, "Emulsifiers and Detergents," MC Publishing Company, Glen Rock, N.J., U.S.A., 1996. Additional inert ingredients useful in the present invention can be found in McCutcheon's, vol. 2, "Functional Materials," MC Publishing Company, Glen Rock, N.J., U.S.A., 1996.

The use of organic solvents including aromatic solvents such as alkylbenzenes and alkylnaphthalenes, ketones such as cyclohexanone and methylcyclohexanone, chlorinated hydrocarbons such as chlorobenzene and trichlorethane, and alcohols such as benzyl alcohol, furfuryl alcohol, butanol and glycol ethers, can be avoided. Preferably these are absent.

The compositions disclosed are in the form of emulsifiable concentrates (EC). Emulsions may be prepared from it by dissolving the limonene emulsifiable composition in water. Further ingredients may be added or may be present in the water to which the emulsifiable concentrate is added, such as a wetting agent, emulsifying agent, or sticker.

Preferably the emulsifiable concentrate comprises at least 500 g/l limonene, preferably at least 550 g/l limonene, most preferably at least 600 g/l limonene, expressed as amount of active ingredient with 100% purity relative to the total volume of the composition.

The invention disclosed herein is also directed to methods of controlling pests on plants comprising application of the compositions disclosed herein to a plant to thereby control said pests.

The compositions disclosed herein can be applied in a number of ways. For example, they can be applied directly to the foliage of a plant, to seeds or to other media in which plants are growing or are to be planted, such as the furrow or in the immediate vicinity of the plant to the soil or where the seed is to be planted prior to sowing. Application methods include spraying, or applying as a vapor.

The compositions may be applied using methods including but not limited to spraying, wetting, dipping, misting, drenching, showering, fogging, soaking, dampening, drizzling, dousing, aerial crop dusting via airplane or helicopter and splashing.

Application can be to any part of the plant or seed including the foliage, stems, branches or roots, or to soil surrounding the roots, or to the seed before it is planted, or to the soil generally, to paddy water or to hydroponic culture systems. The limonene compositions disclosed herein may also be injected into plants or sprayed onto vegetation using electrodynamic spraying techniques or other low volume methods.

The limonene compositions disclosed herein are preferably used for agricultural and horticultural purposes in the form of a water-diluted composition. The type of composition used in any instance will depend upon the particular purpose envisaged.

It is contemplated that the present methods and compositions can be used to protect the seeds, roots and/or the above-ground parts of field, forage, plantation, glasshouse, orchard or vineyard crops, grasses, turf, ornamentals, plantation, household or forest trees.

The plants that may be treated using the methods and compositions disclosed herein can be any species of plant. However, they are preferably the plant species that are agronomically or horticulturally important.

In particular, the plant species can be corn, peanut, canola/rapeseed, soybean, cucurbits, crucifers, cotton, beets, rice, sorghum, sugar beet, wheat, barley, rye, sunflower, tomato, sugarcane, tobacco, oats, as well as other vegetable and leaf crops. In certain embodiments, the crops or plant species may include vineyards, citrus, pecans, almonds, all stone fruits, apples, pears, bananas, lawns, turf, home & garden and garden varieties of plants. The crop concerned is preferable citrus fruit, preferably citrus, or tomatoes.

The plants may also be any ornamental plants, including but not limited to rose, tulip, violet, daffodil, *gladiolus*, lavender, lilies, *narcissus*, orchid, hyacinth, *chrysanthemum*, *crocus*, iris, peonies, zephyranthes, carnation, anthurium, *gloxinia*, azalea, poinsettia, *ageratum*, bamboo, *begonia*, *camellia*, dahlia, *dianthus*, geranium, *impatiens*, lilies of the valley and *lobelia*.

The target pest for the present invention include but are not limited to adult or larvae of any insect or other pest that feeds on the seed, roots and/or shoots and foliage of the plant that is to be protected by the subject methods and compositions.

In a preferred embodiment, the invention provides in a method for curative treatment of insects, preferably insects belonging to the group of Acari or mites, Coccoidea or scales and Aleyrodidae or white flies, more preferably on crops preferable on citrus and tomatoes.

In a preferred embodiment, a composition according to an embodiment of the invention is used in the treatment of mites (*Tetranychus urticae, Panonychus citri* or *Eutetranychus banksi*), preferably mites on citrus fruit, including Broad mite (*Polyphagorarsonemus latus*).

In a more preferred embodiment, a composition according to an embodiment of the invention is used in the treatment of mites, also known as *Tetranychus urticae*, preferably *T. urticae* on citrus fruit.

In another more preferred embodiment, a composition according to an embodiment of the invention is used in the treatment of scales, preferably California red scale, also known as *Aonidiella aurantil*.

In yet another more preferred embodiment, a composition according to an embodiment of the invention is used in the treatment of mites, in particular citrus red mites, also known as *Panonychus citri*, or citrus brown mites, also known as *Eutetranychus africanus*.

In a preferred embodiment, said composition is used at 5-3000 ml product/100 l application liquid wherein the product preferably is a 600 g/l limonene EC formulation or 630 g/l orange oil EC formulation (95% limonene). Preferably, said composition is used at 100-2000 ml product/100 l, more preferably 150 ml-1000 ml product/100 l, most preferably around 500 ml product per 100 litre application liquid. These ranges correspond to 6 to 1800 g/ha limonene. Preferably on hectare is sprayed with 100 l to 2000 l spray water.

The inventors found that scales, mites or whitefly can be treated with 0.06-12 gram/l limonene applied directly on the insects.

An application according to an embodiment of the invention may comprise the following steps:
- emulsifying a limonene comprising substance according to an embodiment of the invention in water to obtain an emulsion;
- applying said emulsion to the crops infected with scales, mites or white flies at an effective dose.

Preferably said effective dose corresponds to an application of 60 to 1800 g limonene per hectare.

The methods of application may be selected from the group consisting of spraying, wetting, dipping, misting, drenching, showering, fogging, soaking, dampening, drizzling, dousing and splashing. Preferably the method of application is spraying.

In a preferred embodiment, the invention is directed to a method of applying an acaricidal/insecticidal composition to a target plant comprising, diluting the limonene emulsifiable compositions described herein into an aqueous composition, wherein said limonene-containing composition is diluted at a rate of 1 part limonene-containing composition to 40-400 parts said aqueous composition; preferably water. In certain preferred embodiments, said limonene-containing composition is diluted at a rate of 1 part limonene-containing composition to 200 parts aqueous composition; preferably water.

In a further aspect, the invention provides in a use of a composition according to an embodiment of the invention as insecticide or acaricide, particularly as insecticide or acaricide against Acari (mites), Coccoide (scales) or Aleyrodidae (white flies).

A composition according to the invention is preferably used as curative insecticide or acaricide. Said composition is preferably brought to a desired rate and is then brought in direct contact with the target insect or acarida pest. In a preferred embodiment the composition is used as an acaricide or insecticide in the treatment of Acari or mites, Coccoidea or scales and Aleyrodidae or white flies.

In another embodiment, the composition is used as an insecticide preferably in treatment of ants, mites, roaches, spiders, flies, wasps, hornets, bees, earwigs, mosquitoes, moths, and other flying insects.

Preferably the emulsified composition is applied at a concentration of 0.06-12 gram limonene per liter emulsion directly on the insects. The use of the composition is preferably curative.

Limonene is a volatile component. Even in the form of a (diluted) composition of the invention it can evaporate within 24 hours after application. This is advantageous as it leaves no residue on the treated plants or crops. This is of particular importance in biological agriculture, where use of synthetic agrochemicals is avoided.

This allows the insecticide to be used until one day before harvesting the plant or crop, leaving a food safe product that can be sold or processed into a food product 24 hours after application as there is no limonene residue after this period. The pre-harvest interval is less than one day.

Treating a with insects infested crop according this method will result in a mortality of said insects higher than 50%, preferably higher that 70%, more preferably higher than 80%, most preferably higher than 90%. The mortality rate of the pest concerned can be measured with techniques known to the skilled person.

The present invention will be now described in more details, referring to examples.

EXAMPLE 1

TABLE 1

| 600 EC orange oil composition, product code BCP425D | | |
|---|---|---|
| Ingredients | g/l | wt/wt % |
| Orange oil | 630 | 71.6 |
| Butylated hydroxytoluene (BHT) | 0.7 | 0.1 |
| Fatty alcohol iso-C13 + 5 EO | 112 | 12.7 |
| triethanolamine alkylbenzenesulfonate solution 50 wt % | 137 | 15.6 |
| No additional solvent | | |
| Total | 879.7 | 100 |

EXAMPLE 2

Use of a 600 EC orange oil composition according to example 1 against California red scale (*Aenidiella aurantii*) in citrus, on orange trees (I10-CIDSS-01 Trial).

One small plot replicated trial was carried out to evaluate the efficacy and selectivity of two foliar applications carried out at 10-14 days interval of BCP425D (630 g/L orange oil; 600 g/l limonene) applied alone at 25, 50, 100 and 200 ml product/100 l for the control of California red scale (*Aonidtella aurantii*) in citrus. No problems were encountered during mixing or application of any of the product formulations tested.

The design, analysis of results and reporting of this study were carried out in accordance with EPPO guidelines PP 1/152(3) and PP 1/181(3). The conduct of the fieldwork was commensurate with local 'Good Agricultural Practice' and in accordance with EPPO guidelines PP 1/135(3) and PP 1/74(2). There were no significant deviations from the EPPO guidelines.

No phytotoxicity symptoms were observed in any plot at any of the assessment timings. A high population of scales (*Aonidiella aurantii*) was present with an even distribution throughout the trial area.

The results are summarized in Table 2-5. From the table it can be observed that the results obtained were comparable with the standard DURSBAN 48 EC (480 g/L Chlorpyrifos), a synthetic active ingredient, applied alone at 200 ml product/100 l. Assessments were made for product efficacy and crop safety at pre-applications, at 20 days after T2 application timing, and when fruits had reached its typical size and colour.

Two foliar applications at 10-14 days interval of BCP425D achieved control of California red scale. A dose response was observed between different tested treatments of BCP425D applied alone: BCP425D applied at 200 ml product/hl achieved control with an efficacy slightly better than standard DURSBAN 48 EC. BCP425D applied at 100 ml product/hl obtained similar total control to standard DURSBAN 48 EC. BCP425D applied at 50 ml product/hi showed efficacy, but lower than standard DURSBAN 48 EC. BCP425D applied at 25 ml product/hi presented the lowest results. Details of assessment dates, crop growth stages and assessment types are presented in Table 2.

TABLE 2

Assessment details

| Date | Timing | Crop growth stage | Crop/ Target | Pest growth stage | Assessment type |
|---|---|---|---|---|---|
| 19 Aug | 0 DAT1 | 79 (100%) | Aonidiella aurantii | L1 (20%) L2 (50%) Young female (30%) | N° of live scales on shoots per plot. |
| 30 Aug | 11 DAT1 0 DAT2 | 79 (100%) | Orange tree Aonidiella aurantii | L2 (30%) Young female (60%) Adult (10%) | Phytotoxicity N° of live scales on shoots per plot. N° of dead scales on shoots per plot. |
| 20 Sep | 21 DAT2 | 79 (100%) | Orange tree Aonidiella aurantii | Young female (40%) Adult (60%) | Phytotoxicity N° of live scales on shoots per plot. N° of dead scales on shoots per plot. N° of live scales on fruit per plot. N° of non-infested, commercial and non-commercial fruits per plot. |
| 11 Oct | 73 DAT2 | 85 (80%) 89 (20%) | Orange tree Aonidiella aurantii | Adult (100%) | Phytotoxicity N° of live scales on fruit per plot. N° of non-infested, commercial and non-commercial fruits per plot. |

Growth stage under BBCH code
DAT = Days after treatment

Assessment data were analysed using a two-way analysis of variance (ANOVA). The probability of no significant differences occurring between treatment means were calculated as the F probability value (p(F)).

TABLE 3

Means total number of living individuals on shoots per plot, and % control

| Nr | Product | Timing | Product g-ml-hl-ha | 0 DAT1 | 11 DAT1 0 DAT2 | 21 DAT2 |
|---|---|---|---|---|---|---|
| 1 | Untreated | — | — | 238.74 a | 278.70 a (0.0%) | 129.09 a (0.0%) |
| 2 | DURSBAN 48 | T1-T2 | 200 ml/hl | 248.40 a | 85.45 cd (68.3%) | 34.58 d (73.2%) |
| 3 | BCP425D | T1-T2 | 25 ml/hl | 263.04 a | 160.26 b (42.5%) | 83.03 b (35.7%) |
| 4 | BCP425D | T1-T2 | 50 ml/hl | 243.50 a | 137.60 b (50.6%) | 62.32 c (51.7%) |
| 5 | BCP425D | T1-T2 | 100 ml/hl | 238.34 a | 109.26 c (60.8%) | 32.01 d (75.2%) |
| 6 | 3CP425D | T1-T2 | 200 ml/hl | 257.72 a | 82.17 cd (70.5%) | 28.51 d (77.9%) |

TABLE 4

Means total number of living individuals on fruits per plot, and % control

| Nr | Product | Timing | Product g-ml-hl-ha | 21 DAT2 | 73 DAT2 |
|---|---|---|---|---|---|
| 1 | Untreated | — | — | 1956.48 a (0.0%) | 4004.73 a (0.0%) |
| 2 | DURSBAN 48 | T1-T2 | 200 ml/hl | 371.69 d (81.0%) | 1038.44 d (74.1%) |
| 3 | BCP425D | T1-T2 | 25 ml/hl | 974.27 b (50.2%) | 2546.28 b (36.4%) |
| 4 | BCP425D | T1-T2 | 50 ml/hl | 674.48 c (65.5%) | 1610.62 c (59.8%) |
| 5 | BCP425D | T1-T2 | 100 ml/hl | 291.31 d (85.1%) | 674.32 d (83.2%) |
| 6 | BCP425D | T1-T2 | 200 ml/h1 | 269.65 d (86.2%) | 551.11 d (86.2%) |

TABLE 5

Means total number of non-infested, commercial and non-commercial fruits per plot

| Nr | Product | Timing | Product g-ml-hl-ha | 21 DAT2 Non Infested | 73 DAT2 Non Infested | 21 DAT2 Commercial | 73 DAT2 Commercial | 21 DAT2 Non Commercial | 73 DAT2 Non Commercial |
|---|---|---|---|---|---|---|---|---|---|
| 1 | Untreated | — | — | 58.00 c (0.0%) | 29.00 b (0.0%) | 27.50 a (0.0%) | 21.75 c (0.0%) | 114.50 a (0.0%) | 149.25 a (0.0%) |
| 2 | DURSBAN 48 | T1-T2 | 200 ml/hl | 118.25 a (+103.9%) | 87.25 a (+200.9%) | 34.25 a (+24.5%) | 43.25 b (+98.9%) | 47.50 c (−58.5%) | 69.50 d (−53.4%) |
| 3 | BCP425D | T1-T2 | 25 ml/hl | 98.75 a (+70.3%) | 45.00 b (+55.2%) | 27.00 a (−1.8%) | 29.00 bc (+33.3%) | 71.75 b (−37.3%) | 126.00 b (−15.6%) |
| 4 | BCP425D | T1-T2 | 50 ml/hl | 127.50 a (+119.8%) | 75.50 a (+160.3%) | 32.25 a (+17.3%) | 35.50 bc (+63.2%) | 40.25 c (−64.8%) | 89.00 c (−40.4%) |
| 5 | BCP425D | T1-T2 | 100 ml/hl | 135.25 a (+133.2%) | 94.75 a (+226.7%) | 28.25 a (+2.7%) | 44.25 b (+103.4%) | 36.50 c (−68.1%) | 61.00 d (−59.1%) |
| 6 | BCP425D | T1-T2 | 200 ml/hl | 131.75 a (+127.2%) | 83.25 a (+187.1%) | 33.25 a (+20.9%) | 60.75 a (+179.3%) | 35.00 c (−69.4%) | 56.00 d (−62.5%) |

From these trial conditions and taking into account the attack level shown by the target pest within trial area, we can conclude that: The pest level (*Aonidiella aurantii*) within the trial area could be considered as very high. Two foliar applications at 10-14 days interval of BCP425D (EC formulation 600 g/l orange oil; 95% limonene) achieved control of California red scale. At some dose rates tested, the product showed an even higher efficacy than reference product DURSBAN 48 EC. BCP425D applied at 200 ml product/hi achieved with an efficacy slightly better than standard DURSBAN 48 EC. BCP425D applied at 100 ml product/hi obtained similar total control to standard DURSBAN 48 EC. BCP425D applied at 50 ml product/hi showed efficacy lower than standard DURSBAN 48 EC. BCP425D applied at 25 ml product/hi presented the lowest results between different experimental rates.

EXAMPLE 3

Use of 600 EC orange oil compositions against mites (*Tetranychus urticae, panonychus citri* or *Eutetranychus banksi*) in citrus (BI12-CIDSS-02-ES Trial).

The objective of the study was to determine the efficacy evaluation of three different Biological Control Agents against mites (*Tetranychus urticae, Panonychus citri* or *Eutetranychus banksi*) in citrus. The performance of the test item was compared with a standard insecticide used at the normal dosage rate. The test item was applied to the crop with the recommendations for use. Trial was carried out in citrus. The study was conducted in compliance with the principles of Good Experimental Practice (GEP) as defined by Regulation 1107/2009 of the European Union.

Evaluation

*Tetranychus urticae* of citrus were identified visually, with the assistance of insect identification keys. *Tetranychus urticae* attacks are uniquely related to *Tetranychus urticae* and therefore visual identification was considered sufficient to conclude that causal agent was *Tetranychus urticae*. The evaluations were performed randomly selecting at least 100 leaves randomly taken citrus trees per plot. The number of living nymphs and adults *Tetranychus urticae* were counted and compared with the untreated plot. Additionally, at every evaluation phytotoxicity symptoms of damage to the crop as chlorosis or deformation were assessed. Vigour (qualitative estimation of plant mass) and growth stage of the crop were assessed visually in comparison with the untreated. Each treated plot was compared with an untreated plot and the percentage of phytotoxicity and vigour estimated.

Calculation

Number of living *Tetranychus urticae* was best suited to assess citrus occurrence. For all treatments and assessment dates the homogeneity of variance was tested by Bartlett's test. In case this test indicated no homogeneity of variance data were transformed to obtain homogeneity of variance.

TABLE 6

Information on test and reference item

| Product | Formulation | Active Ingredient | Dosage rate Ingredient(s) |
|---|---|---|---|
| BORNEO | 11% w/v | Etoxazole | 0.05% v/v |
| BCP425D | 600 g/L | D-Limonene | 0.05% v/v |
| BCP425D | 600 g/L | D-Limonene | 0.01% v/v |
| BCP425D | 600 g/L | D-Limonene | 0.02% v/v |
| BCP425D | 817 g/L | Mineral oil | 1% v/v |
| | Stability in spray solution: Yes | | |

The treatment means of each assessment date were calculated and compared using Student-Newman-Keuls LSD test (p=0.05). The efficacy of the test substance was calculated. Values observed in the treated series were corrected with those of the control series according to the formula of Abbott (1925): $E=(C-T)/C\times100$

*Tetranychus urticae*

C: Number of living *Tetranychus urticae* in the control group.

T: Number of living *Tetranychus urticae* in the treated group.

Results

The results are summarized in the tables presented below, wherein the number of living living nymphs and living adults of *Tetranychus* are tabulated.

TABLE 7

Number of living nymphs *Tetranychus urticae*. Efficacy (%) according to ABBOTT.

| | | Date | | | |
|---|---|---|---|---|---|
| | | 10 September | 17 September | 24 September | 10 October |
| | | Assessment Interval | | | |
| | | 0 DBA A | 7 DAA A | 0 DAA B | 7 DAA B |
| | | | | BBCH Crop | |
| | | 79 | 81 | 81 | 81 |
| T1 | Untreated | 43 a | 42 a | 38 a | 37.5 a |
| T2 | BORNEO 0.05% v/v | 44.3 a | 8 b (81%) | 10 b (73.7%) | 8.5 b (77.3%) |
| T3 | BCP425D 0.05% v/v | 38.5 a | 18 b (57.1%) | 11 b (71.1%) | 15.3 b (59.3%) |
| T4 | BCP425D 0.1% v/v | 41 a | 10 b (76.2%) | 16 b (57.9%) | 9.3 b (75.3%) |
| T5 | BCP425D 0.2% v/v | 34 a | 17 b (59.5%) | 14 b (63.2%) | 14.8 b (60.7%) |
| | LSD (P = .05) | 37.18 | 20.98 | 21.69 | 17.65 |
| | Stand. Deviation | 25.28 | 14.27 | 14.75 | 12.00 |
| | CV | 59.70 | 81.10 | 58.69 | 52.46 |

TABLE 8

Number of living *Anoidiella aurantii* on shoots

| | | Date | | |
|---|---|---|---|---|
| | | 13 September | 20 September | 21 October |
| | | Assessment Interval | | |
| | | 7 DAAC | 7 DAAD | 31 DAAD |
| | | | BBCH Crop | |
| | | 74 | 74 | 81 |
| T1 | Untreated | 263.5 a | 151.5 a | 151.5 a |
| T2 | Dursban 200 g/hL (A, D) | 45.3 b (82.8%) | 46.8 b (69.1%) | 53.0 b (65.0%) |
| T3 | Insegar 40 g/hL (A) | 54.8 b (79.2%) | 54.8 b (63.9%) | 61.8 b (59.2%) |
| T4 | BCP425D 0.05% (A, C) | 88.5 b (66.4%) | 84.5 b (44.2%) | 84.5 b (44.2%) |
| T5 | BCP425D 0.1% (A, C) | 74.8 b (71.6%) | 58.5 b (61.4%) | 59 b (61.1%) |
| T6 | BCP425D 0.2% (A, C) | 65 b (75.3%) | 52.5 b (65.3%) | 57.3 b (62.2%) |
| T7 | BCP425D 0.4% (A, C) | 57.3 b (78.3%) | 40.8 b (73.1%) | 43.5 b (71.3%) |
| | LSD (P = .05) | 50.62 | 40.50 | 39.79 |
| | Stand. Deviation | 34.68 | 27.75 | 27.26 |
| | CV | 40.3 | 43.78 | 41.03 |

TABLE 9

Percentage of citrus fruits with *A. aurantii* (incidence).
Efficacy (%) According To ABBOTT in brackets.
Date 21 October
Assessment Interval 31 DAAD
BBCH Crop 81

| | | |
|---|---|---|
| T1 | Untreated | 85.0 a |
| T2 | Dursban 200 g/hL (A, D) | 22.8 bc (73.2%) |
| T3 | Insegar 40 g/hL (A) | 37.8 b (55.6%) |
| T4 | BCP425D 0.05% (A, C) | 41.0 b (51.8%) |
| T5 | BCP425D 0.1% (A, C) | 38.0 b (55.3%) |
| T6 | BCP425D 0.2% (A, C) | 30.0 bc (64.7%) |
| T7 | BCP425D 0.4% (A, C) | 24.8 bc (70.9%) |
| | LSD (P = .05) | 13.30 |
| | Stand. Deviation | 9.11 |
| | CV | 24.49 |

TABLE 10

Number of citrus fruits without scales, with 1-3 scales (marketable)
and with >3 scales (unmarketable)
Date 21 October
Assessment Interval 31 DAAD
BBCH Crop 81

| Number of Scales | Without Scales | 1-3 Scales (Marketable) | >3 Scales (Unmarketable) |
|---|---|---|---|
| T1 Untreated | 15.0 C | 40.0 a | 45.0 a |
| T2 Dursban 200 g/hL (A, D) | 77.3 ab | 13.3 bc | 9.5 b |
| T3 Insegar 40 g/hL (A) | 62.3 b | 23.8 b | 14.0 b |
| T4 BCP425D 0.05% (A, C) | 59.0 b | 27.0 b | 14.0 b |
| T5 BCP425D 0.1% (A, C) | 62.0 b | 25.0 b | 13.0 b |
| T6 BCP425D 0.2% (A, C) | 70.0 ab | 19.0 bc | 11.0 b |
| T7 BCP425D 0.4% (A, C) | 75.3 ab | 14.3 bc | 10.5 b |
| LSD (P = .05) | 13.30 | 10.57 | 8.16 |
| Stand. Deviation | 9.11 | 7.24 | 5.59 |
| CV | 14.5 | 33.2 | 36.34 |

At the first application of the test items *A. aurantii* were well established. Initial attack was uniform in the untreated plot during trial development. Consequently, the results obtained can be considered as reliable.

The second evaluation 7 days after application A the treatment BCP425D 0.05% (A,C) showed a moderate efficacy of 61% on *A. aurantii* control considering number of living individuals on shoots. The variant BCP425D 0.1% (A,C) showed a moderate efficacy of 71% on *A. aurantii* control considering number of living individuals on shoots. The treatment BCP425D 0.2% (A,C) showed a moderate efficacy of 65% on *A. aurantii* control considering number of living individuals on shoots. The variant BCP425D 0.4% (A,C) showed a moderate efficacy of 67% on *A. aurantii* control considering number of living individuals on shoots.

The treatment with the reference Dursban 200 g/hL (A,D) showed a good efficacy of 83% on *A. aurantii* control considering number of living individuals on shoots. The reference Insegar 40 g/hL demonstrated a moderate efficacy of 64% on *A. aurantii* control considering number of living individuals on shoots.

The third evaluation 7 days after application B the treatment BCP425D 0.05% (A,C) showed a moderate efficacy of 53% on *A. aurantii* control considering number of living individuals on shoots. The variant BCP425D 0.1% (A,C) showed a moderate efficacy of 52% on *A. aurantii* control considering number of living individuals on shoots. The treatment BCP425D 0.2% (A,C) showed a moderate efficacy of 70% on *A. aurantii* control considering number of living individuals on shoots. The variant BCP425D 0.4% (A,C) showed a moderate efficacy of 73% on *A. aurantii* control considering number of living individuals on shoots. The treatment with the reference Dursban 200 g/hL (A,D) showed a moderate efficacy of 71% on *A. aurantii* control considering number of living individuals on shoots. The reference Insegar 40 g/hL demonstrated a low efficacy of 32% on *A. aurantii* control considering number of living individuals on shoots.

The fourth evaluation 7 days after application C the treatment BCP425D 0.05% (A,C) showed a moderate efficacy of 66% on *A. aurantii* control considering number of living individuals on shoots. The variant BCP425D 0.1% (A,C) showed a moderate efficacy of 72% on *A. aurantii* control considering number of living individuals on shoots. The treatment BCP425D 0.2% (A,C) showed a good efficacy of 75% on *A. aurantii* control considering number of living individuals on shoots. The variant BCP425D 0.4% (A,C) showed a good efficacy of 78% on *A. aurantii* control considering number of living individuals on shoots. The treatment with the reference Dursban 200 g/hL (A,D) showed a good efficacy of 83% on *A. aurantii* control considering number of living individuals on shoots. The reference Insegar 40 g/hL demonstrated a good efficacy of 79% on *A. aurantii* control considering number of living individuals on shoots.

The fifth evaluation 7 days after application C the treatment BCP425D 0.05% (A,C) showed a low efficacy of 44% on *A. aurantii* control considering number of living individuals on shoots. The variant BCP425D 0.1% (A,C) showed a moderate efficacy of 61% on *A. aurantii* control considering number of living individuals on shoots. The treatment BCP425D 0.2% (A,C) showed a moderate efficacy of 65% on *A. aurantii* control considering number of living individuals on shoots. The variant BCP425D 0.4% (A,C) showed a moderate efficacy of 73% on *A. aurantii* control considering number of living individuals on shoots. The treatment with the reference Dursban 200 g/hL (A,D) showed a moderate efficacy of 69% on *A. aurantii* control considering number of living individuals on shoots. The reference Insegar 40 g/hL demonstrated a moderate efficacy of 64% on *A. aurantii* control considering number of living individuals on shoots.

At the last evaluation 31 days after application A the treatment BCP425D 0.05% (A,C) showed a low efficacy of 44% on *A. aurantii* control considering number of living individuals on shoots. The variant BCP425D 0.1% (A,C) showed a moderate efficacy of 61% on *A. aurantii* control considering number of living individuals on shoots. The treatment BCP425D 0.2% (A,C) showed a moderate efficacy of 62% on *A. aurantii* control considering number of living individuals on shoots. The variant BCP425D 0.4% (A,C) showed a moderate efficacy of 71% on *A. aurantii* control considering number of living individuals on shoots.

The treatment with the reference Dursban 200 g/hL (A,D) showed a moderate efficacy of 65% on *A. aurantii* control considering number of living individuals on shoots. The reference Insegar 40 g/hL demonstrated a moderate efficacy of 59% on *A. aurantii* control considering number of living individuals on shoots.

During the last evaluation the citrus fruits were assessed as classified depending on the number of scales present. The treatment BCP425D 0.05% (A,C) showed a moderate efficacy of 52% considering number of fruits with *A. aurantii* attack. The 86% of citrus fruits were classified as marketable which showed any scale or 1-3 scales. The variant BCP425D 0.1% (A,C) showed a moderate efficacy of 55% considering number of fruits with *A. aurantii* attack. The 86% of citrus fruits were classified as marketable which showed any scale or 1-3 scales. The treatment BCP425D 0.2% (A,C) showed a moderate efficacy of 65% considering number of fruits with *A. aurantii* attack. The 87% of citrus fruits were classified as marketable which showed any scale or 1-3 scales. The variant BCP425D 0.4% (A,C) showed a moderate efficacy of 71% considering number of fruits with *A. aurantii* attack. The 90% of citrus fruits were classified as marketable which showed any scale or 1-3 scales.

The treatment with the reference Dursban 200 g/hL (A,D) showed a moderate efficacy of 73% considering number of fruits with *A. aurantii* attack. The 91% of citrus fruits were classified as marketable which showed any scale or 1-3 scales. The reference Insegar 40 g/hL demonstrated a moderate efficacy of 56% considering number of fruits with *A. aurantii* attack. The 86% of citrus fruits were classified as marketable which showed any scale or 1-3 scales.

The study demonstrated that the applications at the recommended dosage of the following test item: BCP425D 0.4% produced a consistent efficacy controlling *A. aurantii* of citrus in a period of about two months. Results were comparable, even better, with the references Dursban 200 g/hL and Insegar 40 g/hL.

EXAMPLE 4: STORAGE STABILITY

Table 11 represents an overview of different limonene formulations, differing from each other in the surfactant and wetting agent used. These compositions were exposed to different storage conditions and the results were noted. A summary is presented in Table 12.

All compositions comprise 600 ml limonene and 0.7 ml BHT. Surfactants with HLB-values classically used for emulsion of oil in water like dodecylbenzene sulfonate salt of calcium in solvent, ethoxylated (16EO) tristyrylphenol, ethoxylated (40 EO) castor oil, ethoxylated propoxylated fatty alcohol and ethoxylated propoxylated butanol showed an unstable formulation, with phase separation, gel formation or the formation of a precipitate either at storage at low temperature, −5° C. or at elevated temperatures, of 54° C., representative of an long term storage stability test.

A most preferred embodiment of the invention is the formulation under code BA0893/14.

Compositions BA0895/14, BA0896/14, BA0897/14 and BA0898 (comparative examples) did not provide emulsion concentrates, as can be seen from the presence of 2 phases (phase separation) or gel-formation.

The first column marked "Invention" provides a composition according to a preferred embodiment, wherein the anionic wetting agent is dodecylbenzene sulfonate salt of triethanolamine. This selection provides some further improvement over the use of dodecylbenzene sulfonate salt of calcium.

EXAMPLE 5: CLASSIFICATION

A product according to example 1, with 600 g limonene/l was unclassified for its toxicity by inhalation based on toxicology studies.

This is surprising as the commercial product Prev-Am® with 60 g/l orange oil is classified Xn (harmful).

TABLE 11

Compositions of formulations tested in storage stability experiments

| Formulation (ml) | BA0893/14 Preferred embodiment Invention | BA0894/14 Invention | BA0895/14 | BA0896/14 | BA0897/14 | BA0898/14 |
|---|---|---|---|---|---|---|
| Orange oil | 600 | 600 | 600 | 600 | 600 | 600 |
| BHT | 0.7 | 0.7 | 0.7 | 0.7 | 0.7 | 0.7 |
| ethoxylated (6EO) fatty alcohol (HLB 10.5) | 132.88 | 132.88 | | | | |
| dodecylbenzene sulfonate salt of triethanolamine (HLB 10.6) | 161.87 | | 161.87 | 161.87 | 161.87 | 161.87 |
| dodecylbenzene sulfonate salt of calcium (HLB 8.5) | | 161.87 | | | | |
| ethoxylated (16EO) tristyryl-phenol (HLB 14.5) | | | 132.88 | | | |
| Ethoxylated (40 EO) castor oil (HLB 16) | | | | 132.88 | | |
| ethoxylated propoxylated fatty alcohol | | | | | 132.88 | |
| ethoxylated propoxylated butanol (HLB 16.5) | | | | | | 132.88 |

TABLE 12

Physical appearance of tested formulations

| Test/physical appearance | BA0893/14 Preferred embodiment Invention | BA0894/14 Invention | BA0895/14 | BA0896/14 | BA0897/14 | BA0898/14 |
|---|---|---|---|---|---|---|
| after 14 days at room | liquid, yellow, limpid, | liquid, yellow, limpid, cloud | liquid turbid with | liquid turbid with | gel, slightly turbid. | gel, slightly turdid. |

TABLE 12-continued

Physical appearance of tested formulations

| Test/physical appearance | BA0893/14 Preferred embodiment Invention | BA0894/14 Invention | BA0895/14 | BA0896/14 | BA0897/14 | BA0898/14 |
|---|---|---|---|---|---|---|
| temperature | homogeneous | at the bottom | 2 phases | 2 phases | homogeneous | homogeneous |
| after 14 days at 54° C. | liquid, yellow, limpid, homogeneous | liquid, yellow, limpid, homogeneous | liquid turbid with 2 phases | liquid turbid with 2 phases | gel, slightly turbid, homogeneous | gel, slightly turdid, homogeneous |
| after 14 days at 0° C. | liquid, yellow, limpid, small cloud at the bottom | liquid, yellow, limpid, small cloud at the bottom | liquid turbid with 2 phases | liquid turbid with 2 phases | gel, slightly turbid, homogeneous | gel, slightly turdid, homogeneous |
| after 14 days at −5° C. | liquid, yellow, limpid, small cloud at the bottom | liquid, yellow, limpid, small cloud at the bottom | liquid turbid with 2 phases | liquid turbid with 2 phases | gel, slightly turbid, homogeneous | gel, slightly turdid. homogeneous |

The invention claimed is:

1. An insecticidal or acaricidal composition, comprising an emulsifiable concentrate comprising more than 50 wt % limonene as an active ingredient,
between 12-20 wt % of an emulsifying fatty alcohol ethoxylate surfactant having a hydrophilic-lipophilic balance (HLB) between 7 and 12, and no emulsifying surfactant having an HLB of 12 to 16,
less than 10 wt % solvent,
between 15-25 wt % of an anionic surfactant wetting agent;
wherein all weights are based on the total weight of the composition,
wherein the insecticidal or acaricidal emulsifiable concentrate, upon dilution with water and spraying as a water diluted spray, provides a dose rate of 60 g to 1,800 g limonene per hectare such that the composition is effective in the treatment of Acari or mites, Coccoidea or scales and Aleyrodidae or white flies, and
wherein the insecticidal or acaricidal emulsifiable concentrate is stable after 14 days at a temperature of 0° C., −5° C., room temperature or 54° C.

2. The insecticidal or acaricidal composition according to claim 1, with a cold storage stability at a temperature between −5° C. to +4° C. for at least one day.

3. The insecticidal or acaricidal composition according to claim 1 wherein limonene is present as terpene-rich oil.

4. The insecticidal or acaricidal composition according to claim 3, wherein the terpene-rich oil is orange oil.

5. The insecticidal or acaricidal composition according to claim 1, further comprising an antioxidant selected from the group consisting of diphenylamine, ethoxyquin, BHA (3-t-butyl-4-hydroxyanisole and 2-t-butyl-4-hydroxyanisole), BHT (2,6-di-tert-butyl-p-cresol), ascorbic acid, a tocopherol, a polyphenol, or a combination thereof.

6. The insecticidal or acaricidal composition according to claim 1, further comprising less than 1% by weight antioxidant.

7. The insecticidal or acaricidal composition according to claim 6, comprising less than 0.1% by weight antioxidant.

8. The insecticidal or acaricidal composition according to claim 1, comprising less than 1 wt. % solvent based on the total weight of the composition, wherein the composition is unclassified for toxicity.

9. The insecticidal or acaricidal composition according to claim 1, comprising between 12 and 20 wt % emulsifying fatty alcohol ethoxylate surfactant and between 15 and 20 wt % anionic surfactant wetting agent expressed as the total weight of the composition.

* * * * *